(12) United States Patent
Hsieh

(10) Patent No.: US 10,882,288 B2
(45) Date of Patent: Jan. 5, 2021

(54) MULTIFUNCTION MAT

(71) Applicant: Chin-San Hsieh, Tainan (TW)

(72) Inventor: Chin-San Hsieh, Tainan (TW)

(*) Notice: Subject to any disclaimer, the term of this patent is extended or adjusted under 35 U.S.C. 154(b) by 0 days.

(21) Appl. No.: 16/782,098

(22) Filed: Feb. 5, 2020

(65) Prior Publication Data

US 2020/0171807 A1 Jun. 4, 2020

(51) Int. Cl.
| | |
|---|---|
| *B32B 7/09* | (2019.01) |
| *B32B 27/12* | (2006.01) |
| *B32B 7/12* | (2006.01) |
| *B32B 3/26* | (2006.01) |
| *B01D 53/02* | (2006.01) |
| *A47C 31/00* | (2006.01) |
| *A47C 27/00* | (2006.01) |
| *A47G 9/00* | (2006.01) |
| *A47G 9/02* | (2006.01) |
| *B32B 5/02* | (2006.01) |

(52) U.S. Cl.
CPC ............ *B32B 27/12* (2013.01); *A47C 27/002* (2013.01); *A47C 31/007* (2013.01); *A47G 9/007* (2013.01); *A47G 9/0238* (2013.01); *B01D 53/02* (2013.01); *B32B 3/266* (2013.01); *B32B 5/022* (2013.01); *B32B 7/09* (2019.01); *B32B 7/12* (2013.01); *A47C 27/006* (2013.01); *B01D 2253/102* (2013.01); *B01D 2257/90* (2013.01); *B32B 2260/021* (2013.01); *B32B 2260/046* (2013.01); *B32B 2262/062* (2013.01); *B32B 2307/7248* (2013.01); *B32B 2307/7265* (2013.01); *B32B 2479/00* (2013.01); *Y10T 428/24033* (2015.01); *Y10T 428/24331* (2015.01)

(58) Field of Classification Search
CPC ..... Y10T 428/24033; Y10T 428/24331; B32B 3/266; B32B 5/022; B32B 7/09; B32B 7/12; A47C 27/006; A47G 9/007; A47G 9/0238
See application file for complete search history.

(56) References Cited

U.S. PATENT DOCUMENTS

2015/0257060 A1* 9/2015 Goto ................. H04L 5/0098
370/331

* cited by examiner

*Primary Examiner* — Alexander S Thomas

(57) ABSTRACT

A multifunction mat includes two outer fabric layers, a resin cotton layer, two non-woven fabric layers, an activated carbon filter layer and a breathable waterproof layer. The outer fabric layers are disposed on top and bottom surfaces of the multifunction mat respectively. The resin cotton layer is sandwiched between one outer fabric layer on the top surface and the non-woven fabric layer and is secured to one outer fabric layer. One non-woven fabric layer is sandwiched between the resin cotton layer and the activated carbon filter layer and the other non-woven fabric layer is sandwiched between the activated carbon filter layer and the breathable waterproof layer. The activated carbon filter layer is sandwiched between the non-woven fabric layers and is capable of destroying odors of air. The breathable waterproof layer is sandwiched between the other outer fabric layer on the bottom surface and the other non-woven fabric layer.

10 Claims, 5 Drawing Sheets

MULTIFUNCTION MAT

BACKGROUND OF THE INVENTION

1. Field of the Invention

The invention relates to mats and more particularly to a multifunction mat capable of destroying odors.

2. Description of Related Art

Air pollution is gradually becoming severe. Thus, there are many respiratory diseases and some are even epidemic. How to prevent people from being infected by the respiratory disease is gaining more attention. Hospitals have taken a great attention to indoor air quality. There are many contaminated even toxic particulates in the air. In a hospital, body odor and medicine odor are omnipresent in the air. Poor air quality in the hospital is harmful to patients such as children, senior citizens, ones having respiratory diseases, or ones lying on the bed.

Beds of homes or hospitals may be contaminated by pollutants in the air. The contaminated mattresses of beds are discarded and replaced with new ones.

However, body odors, excretion of patients, or medicine smell may permeate the whole home or ward, resulting in a deterioration of air quality. Further, the discarded mattresses may harm the environment.

Thus, how to prevent air in a hospital from being polluted due to contaminated mattresses or sheets and protect the environment is an issue to be addressed by the invention disclosed below.

SUMMARY OF THE INVENTION

It is therefore one object of the invention to provide a multifunction mat capable of destroying odors.

For achieving above and other objects, the invention provides a multifunction mat comprising two outer fabric layers, a resin cotton layer, two non-woven fabric layers, an activated carbon filter layer and a breathable waterproof layer wherein the outer fabric layers are disposed on top and bottom surfaces of the multifunction mat respectively; the resin cotton layer is sandwiched between one outer fabric layer on the top surface and the non-woven fabric layer and is secured to one outer fabric layer so that the multifunction mat is more resilient; one non-woven fabric layer is sandwiched between the resin cotton layer and the activated carbon filter layer and the other non-woven fabric layer is sandwiched between the activated carbon filter layer and the breathable waterproof layer so that activated carbon in the activated carbon filter layer is protected and is prevented from being lost due to body rubbing and washing; the activated carbon filter layer is sandwiched between the non-woven fabric layers and is capable of destroying odors of air entered the multifunction mat;

and the breathable waterproof layer is sandwiched between the other outer fabric layer on the bottom surface and the other non-woven fabric layer and is capable of preventing moisture or excretion from leaving the multifunction mat.

Preferably, the outer fabric layers, the resin cotton layer, the non-woven fabric layers, the activated carbon filter layer and the breathable waterproof layer are secured together by adhering, heating, pressing, or stitching.

Preferably, the multifunction mat is implemented as a bed sheet or mattress.

Preferably, the multifunction mat is made of washable reusable material or disposable material.

Preferably, the outer fabric layer has a plurality of apertures.

The multifunction mat of the invention has the following advantages and benefits in comparison with the conventional art: Air may enter through the apertures of the outer fabric layer and moisture can be absorbed accordingly. Entered air can be deodorized by the activated carbon and the breathable outer fabric layer. Thus, fresh air is generated. The activated carbon is prevented from being lost. The activated carbon filter layer is sandwiched between two non-woven fabric layers. Thus, the activated carbon is prevented from being lost due to body rubbing and washing. The breathable waterproof layer can prevent water from flowing out of the multifunction mat. Excretion or moisture is prevented from leaving the breathable waterproof layer of the multifunction mat when a patient lies on a bed incorporating the multifunction mat. Thus, the environment is not polluted. The washing material of the invention capable of being used many times does not harm the environment and can greatly decrease waste.

The above and other objects, features and advantages of the invention will become apparent from the following detailed description taken with the accompanying drawings.

DETAILED DESCRIPTION OF THE INVENTION

Figure 1:
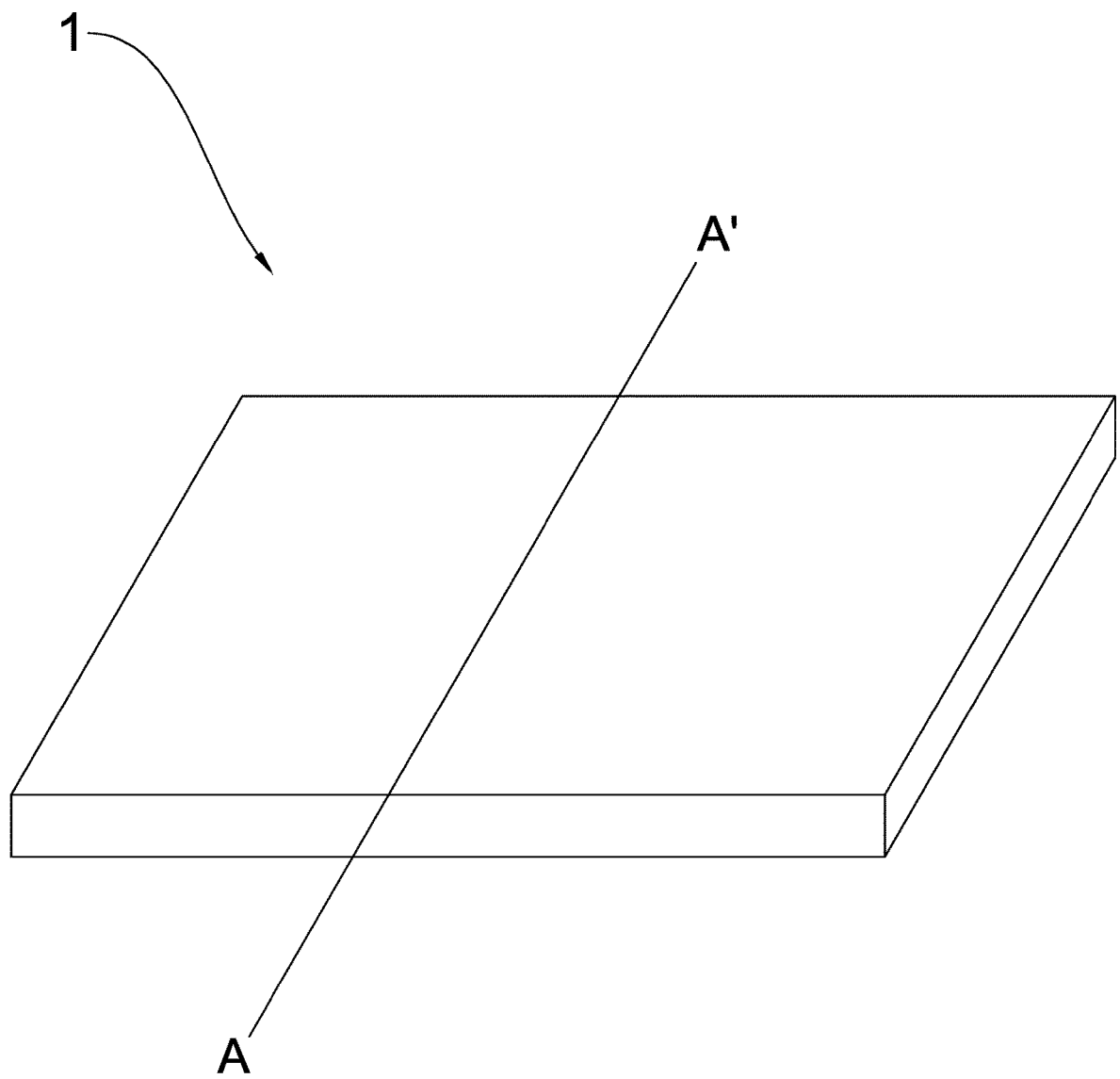
FIG. 1 is a perspective view of a multifunction mat according to a first preferred embodiment of the invention.
Figure 2:
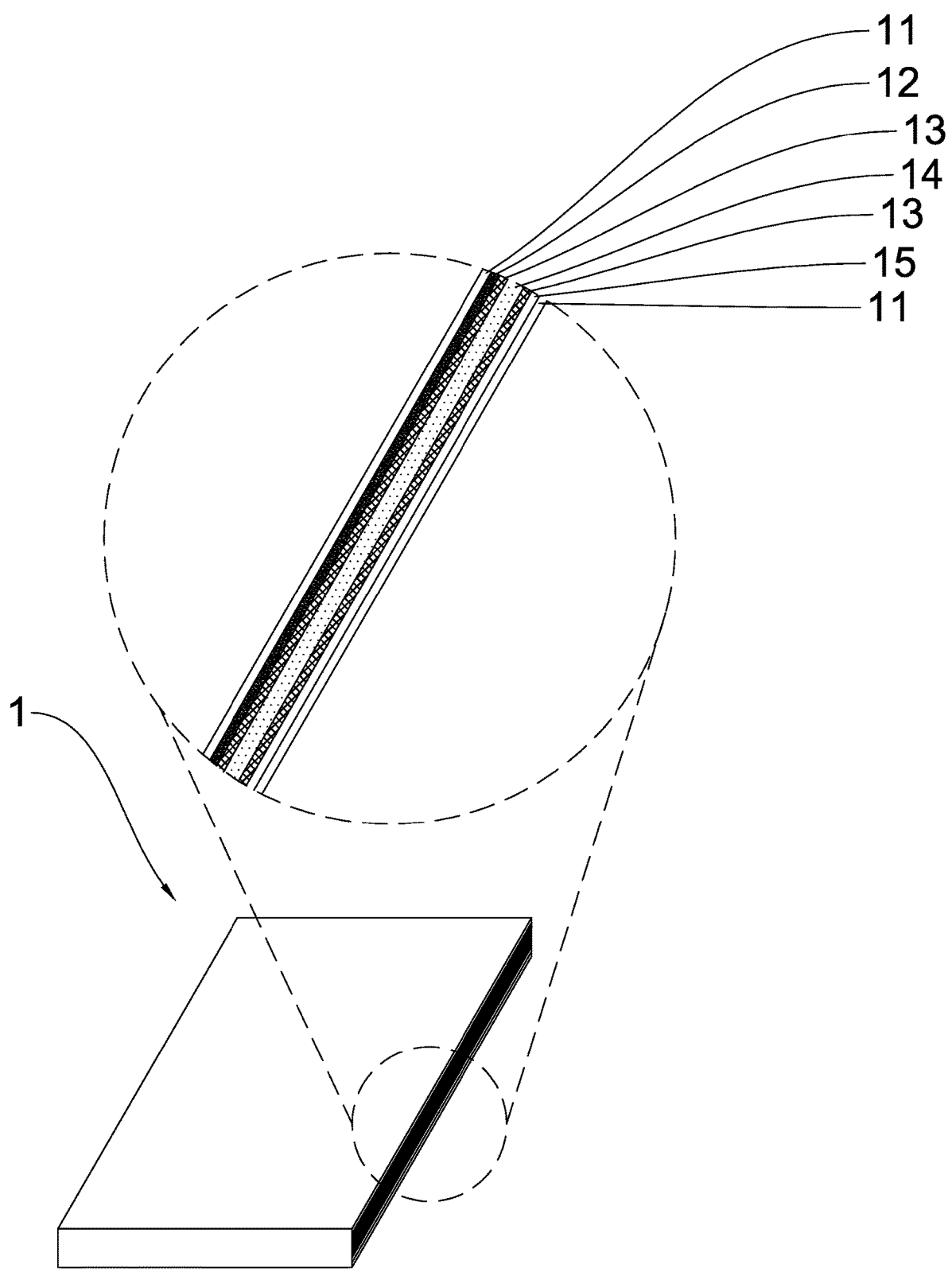
FIG. 2 is a sectional view along line A-A' of FIG. 1.
Figure 3:
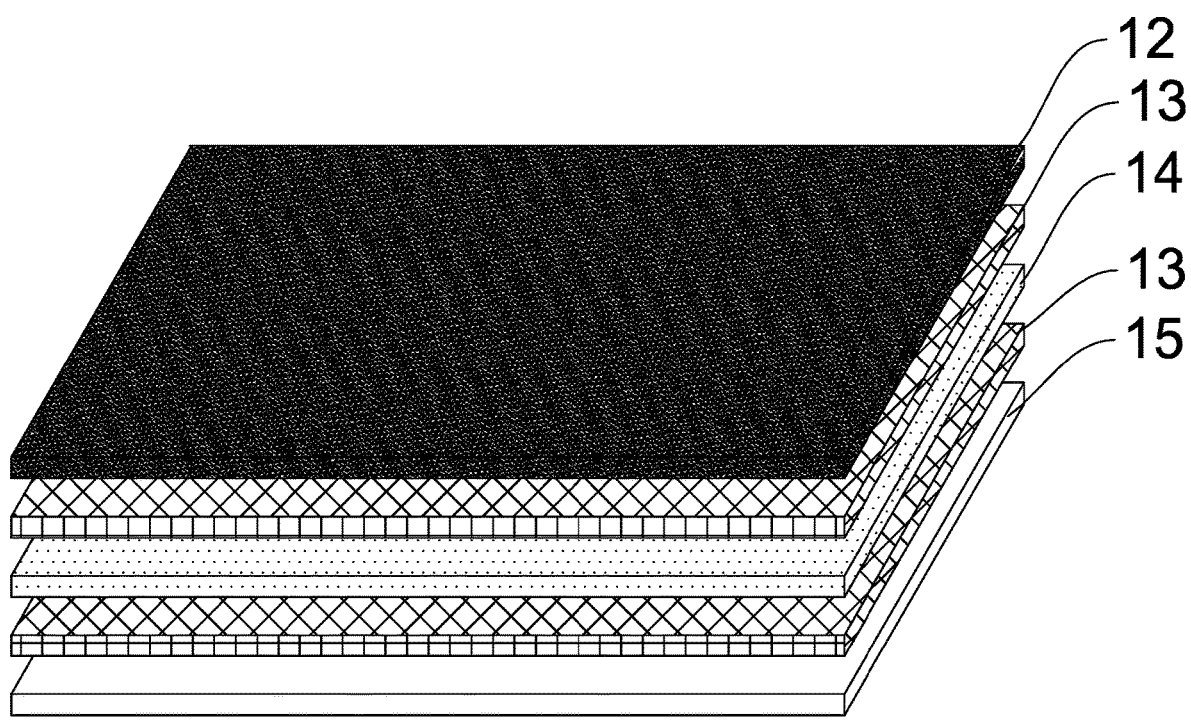
FIG. 3 is a perspective view of inside of the multifunction mat.

Referring to FIGS. 1 to 3, a multifunction mat 1 in accordance with a first preferred embodiment of the invention comprising two outer fabric layers 11, a resin cotton layer 12, two non-woven fabric layers 13, an activated carbon filter layer 14 and a breathable waterproof layer 15 are discussed in detail below.

The outer fabric layers 11 are disposed on top and bottom surfaces of the multifunction mat 1 respectively. The outer fabric layer 11 has apertures for exiting air and is made of a breathable, water absorption material.

The resin cotton layer 12 is sandwiched between one outer fabric layer 11 on the top and the non-woven fabric layer 13 and secured to one outer fabric layer 11 so that the multifunction mat 1 is more resilient.

One non-woven fabric layer 13 is sandwiched between the resin cotton layer 12 and the activated carbon filter layer 14 and the other non-woven fabric layer 13 is sandwiched between the activated carbon filter layer 14 and the breathable waterproof layer 15. Thus, the activated carbon in the activated carbon filter layer 14 is protected and is prevented from being lost due to body rubbing and washing.

The activated carbon filter layer 14 is made of activated carbon and is sandwiched between one non-woven fabric layer 13 and the other non-woven fabric layer 13 so that the activated carbon in the activated carbon filter layer 14 is prevented from being lost due to rubbing, washing, etc. The activated carbon is capable of destroying odors of air entered the multifunction mat 1.

The breathable waterproof layer 15 is sandwiched between the other outer fabric layer 11 on the bottom and the other non-woven fabric layer 13. The breathable waterproof layer 15 is capable of preventing moisture or excretion from leaving the multifunction mat 1.

The outer fabric layers 11, the resin cotton layer 12, the non-woven fabric layers 13, the activated carbon filter layer 14 and the breathable waterproof layer 15 are secured together by adhering, heating, pressing, or stitching.

The multifunction mat 1 is made of low cost material so as to greatly decrease the manufacturing cost and the price sold on the market.

The multifunction mat 1 is implemented as a bed sheet or mattress and has the functions of destroying odors, filtering, and moisture absorption and is hygienic. The multifunction mat 1 is made of disposable material or washable reusable material which is preferred in consideration of environmental protection.

Figure 4:
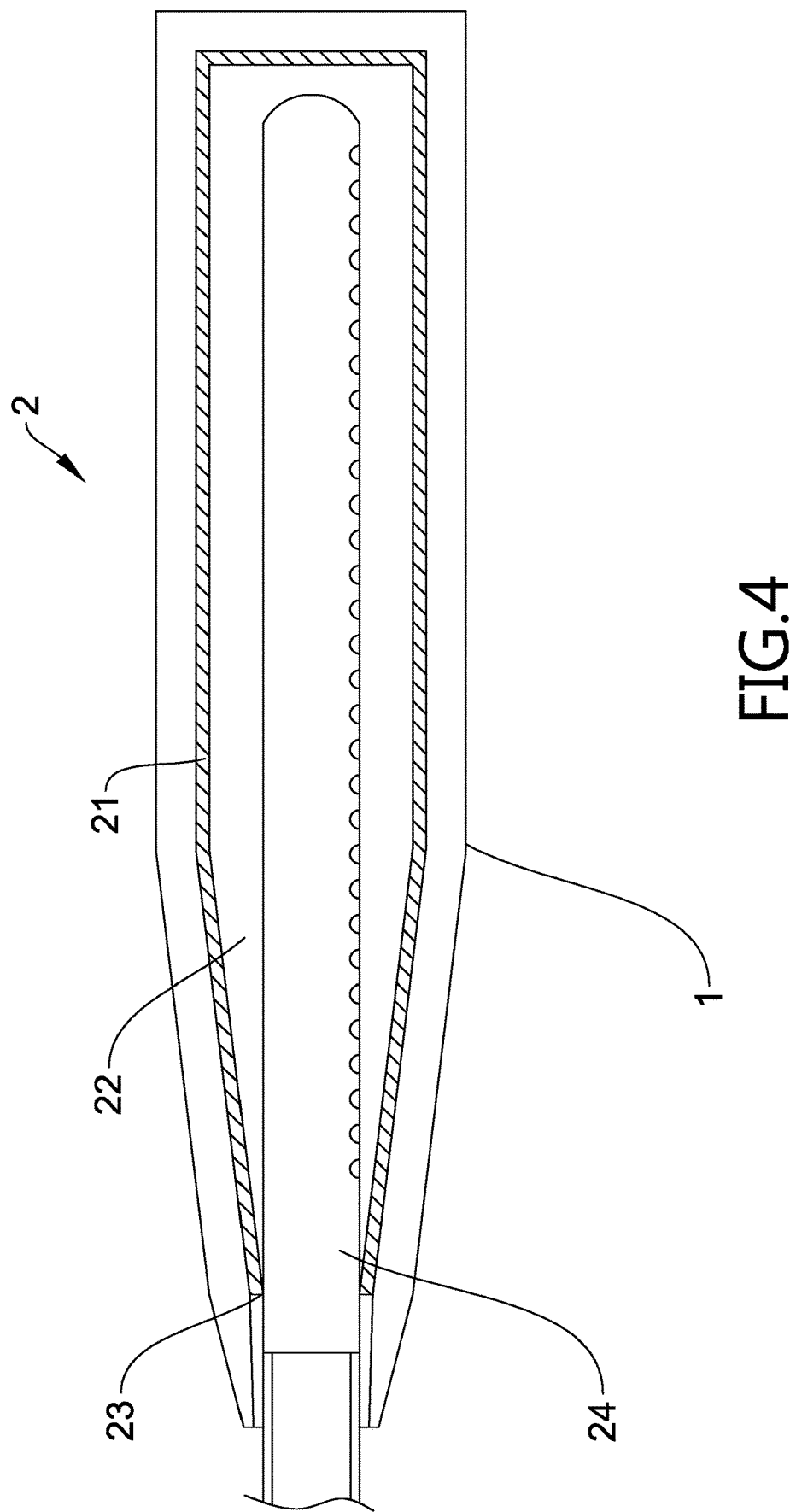
FIG. 4 schematically depicts a multifunction mat according to a second preferred embodiment of the invention.

Referring to FIG. 4, a second preferred embodiment of the invention is shown. In detail, it is implemented in a filtering device 2 for an aquarium which includes the multifunction mat 1 and a filter 21 is disposed in the activated carbon filter layer (not shown) of the multifunction mat 1 and is made of at least one resin layer. The filter 21 is capable of filtering out large particles. An innermost filtering space 22 is provided in the filtering device 2. A water inlet 23 is provided through the filtering device 2 to communicate with the filtering space 22. The water inlet 23 is connected to a water pipe 24 which has one end immersed in water of an aquarium (not shown) and the other end communicating with the water inlet 23. Thus, water in the aquarium may flow to the water inlet 23 through the water pipe 24.

Figure 5:
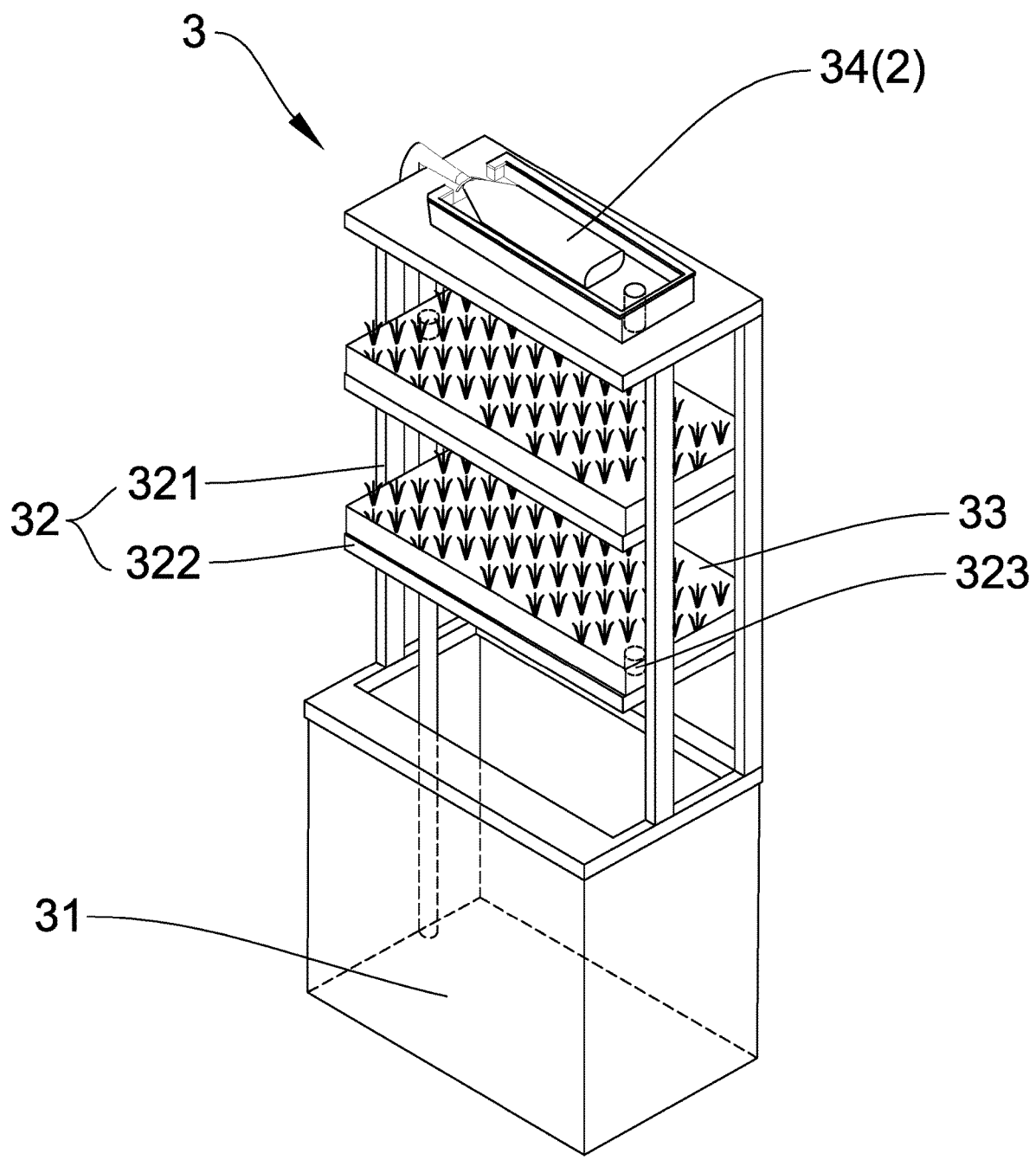
FIG. 5 schematically depicts a multifunction mat according to a third preferred embodiment of the invention.

Referring to FIG. 5, a third preferred embodiment of the invention is shown. In detail, it is combination of the filtering device for an aquarium of the second preferred embodiment and the multifunction mat of the first preferred embodiment and is implemented as an aquaculture device 3. The aquaculture device 3 comprises an aquarium 31, a plurality of supports 32, a plurality of aquaculture units 33, and a filter 34. The aquarium 31 is used to keep and display aquatic plants or animals. The supports 32 are mounted on a top of the aquarium 31 and each support 32 includes a post 321 mounted on the aquarium 31, at least one platform 322 secured to the post 321, and a drain 323 mounted through a bottom of the platform 322 for drawing water out of the platform 322. The aquaculture unit 33 is mounted on the platform 322 with a plurality of different plants grown thereon. Further, water absorbed by the plants may flow to the drain 323. The filter 34 is the same as the filter 2 of the second preferred embodiment and is mounted on the topmost platform 322. The filter 34 has technical features the same as the filter 2 of the second preferred embodiment including the multifunction mat (not shown) of the first preferred embodiment mounted on the outer layer of the filter 34 and a filtering net (not shown) covered the activated carbon filter layer in the multifunction mat (not shown).

The multifunction mat of the invention capable of destroying odors has the following advantages and benefits in comparison with the conventional art:

Breathability and moisture absorption: Air may enter through the apertures of the outer fabric layer and moisture can be absorbed accordingly.

Deodorization: Entered air can be deodorized by the activated carbon and the breathable outer fabric layer. Thus, fresh air is generated.

The activated carbon is prevented from being lost. The activated carbon filter layer is sandwiched between two non-woven fabric layers. Thus, the activated carbon is prevented from being lost due to body rubbing and washing.

No pollution to the environment: The breathable waterproof layer can prevent water from flowing out of the multifunction mat. Excretion or moisture is prevented from leaving the breathable waterproof layer of the multifunction mat when a patient lies on a bed incorporating the multifunction mat. Thus, the environment is not polluted.

Environmental protection: The washing material of the invention capable of being used many times does not harm the environment and can greatly decrease waste.

While the invention has been described in terms of preferred embodiments, those skilled in the art will recognize that the invention can be practiced with modifications within the spirit and scope of the appended claims.

What is claimed is:

1. A multifunction mat, comprising two outer fabric layers, a resin cotton layer, two non-woven fabric layers, an activated carbon filter layer and a breathable waterproof layer wherein:

the outer fabric layers are disposed on top and bottom surfaces of the multifunction mat respectively;

the resin cotton layer is sandwiched between one outer fabric layer on the top surface and the non-woven fabric layer and is secured to one outer fabric layer so that the multifunction mat is more resilient;

one non-woven fabric layer is sandwiched between the resin cotton layer and the activated carbon filter layer and the other non-woven fabric layer is sandwiched between the activated carbon filter layer and the breathable waterproof layer so that activated carbon in the activated carbon filter layer is protected and is prevented from being lost due to body rubbing and washing;

the activated carbon filter layer is sandwiched between the non-woven fabric layers and is capable of destroying odors of air entered the multifunction mat; and the breathable waterproof layer is sandwiched between the other outer fabric layer on the bottom surface and the other non-woven fabric layer and is capable of preventing moisture or excretion from leaving the multifunction mat.

2. The multifunction mat of claim 1, wherein the outer fabric layers, the resin cotton layer, the non-woven fabric layers, the activated carbon filter layer and the breathable waterproof layer are secured together by adhering.

3. The multifunction mat of claim 1, wherein the outer fabric layers, the resin cotton layer, the non-woven fabric layers, the activated carbon filter layer and the breathable waterproof layer are secured together by heating.

4. The multifunction mat of claim 1, wherein the outer fabric layers, the resin cotton layer, the non-woven fabric layers, the activated carbon filter layer and the breathable waterproof layer are secured together by pressing.

5. The multifunction mat of claim 1, wherein the outer fabric layers, the resin cotton layer, the non-woven fabric layers, the activated carbon filter layer and the breathable waterproof layer are secured together by stitching.

6. The multifunction mat of claim 1, wherein the multifunction mat is implemented as a bed sheet.

7. The multifunction mat of claim 1, wherein the multifunction mat is implemented as a mattress.

8. The multifunction mat of claim 1, wherein the multifunction mat is made of washable reusable material.

9. The multifunction mat of claim 1, wherein the multifunction mat is made of disposable material.

10. The multifunction mat of claim 1, wherein the outer fabric layer has a plurality of apertures.

\* \* \* \* \*